US012192478B2

(12) United States Patent
Lin et al.

(10) Patent No.: US 12,192,478 B2
(45) Date of Patent: Jan. 7, 2025

(54) ADAPTIVELY ENCODING VIDEO FRAMES USING CONTENT AND NETWORK ANALYSIS

(71) Applicant: Intel Corporation, Santa Clara, CA (US)

(72) Inventors: Yunbiao Lin, Shanghai (CN); Changliang Wang, Bellevue, WA (US); Ximin Zhang, San Jose, CA (US); Fan He, Shanghai (CN); Jill Boyce, Portland, OR (US); Sri Ranjan Srikantam, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 255 days.

(21) Appl. No.: 17/764,162

(22) PCT Filed: Nov. 14, 2019

(86) PCT No.: PCT/CN2019/118301
§ 371 (c)(1),
(2) Date: Mar. 25, 2022

(87) PCT Pub. No.: WO2021/092821
PCT Pub. Date: May 20, 2021

(65) Prior Publication Data
US 2022/0408097 A1     Dec. 22, 2022

(51) Int. Cl.
*H04N 19/146*     (2014.01)
*H04N 19/142*     (2014.01)
(Continued)

(52) U.S. Cl.
CPC ......... *H04N 19/146* (2014.11); *H04N 19/142* (2014.11); *H04N 19/172* (2014.11); *H04N 19/184* (2014.11)

(58) Field of Classification Search
CPC .. H04N 19/436; H04N 19/119; H04N 19/124; H04N 19/147; H04N 19/17; H04N 19/167; H04N 19/174
See application file for complete search history.

(56) References Cited

U.S. PATENT DOCUMENTS

2013/0094564 A1     4/2013  Yang et al.
2016/0295216 A1*   10/2016  Aaron ................. H04N 19/124
(Continued)

FOREIGN PATENT DOCUMENTS

CN     103955905 A    7/2014
CN     103974060 A    8/2014

OTHER PUBLICATIONS

International Searching Authority, "International Preliminary Report on Patentability," issued in connection with International Patent Application No. PCT/CN2019/118301, mailed on May 27, 2022, 6 pages.
(Continued)

*Primary Examiner* — Tat C Chio
(74) *Attorney, Agent, or Firm* — HANLEY, FLIGHT & ZIMMERMAN, LLC (57) ABSTRACT

An example apparatus for adaptively encoding video frames includes a network analyzer to predict an instant bitrate based on channel throughput feedback received from a network. The apparatus also includes a content analyzer to generate ladder info based on a received frame. The apparatus further includes an adaptive decision executer to determine a frame rate, a video resolution, and a target frame size based on the predicted instant bitrate and the ladder outputs. The apparatus further includes an encoder to encode the frame based on the frame rate, the video resolution, and the target frame size.

23 Claims, 6 Drawing Sheets

(51) Int. Cl.
*H04N 19/172* (2014.01)
*H04N 19/184* (2014.01)

(56) References Cited

U.S. PATENT DOCUMENTS

| | | | | |
|---|---|---|---|---|
| 2017/0078676 | A1* | 3/2017 | Coward | H04N 19/164 |
| 2018/0089562 | A1* | 3/2018 | Jin | G06F 7/5443 |
| 2018/0184089 | A1* | 6/2018 | Zhang | H04N 19/172 |
| 2018/0278979 | A1 | 9/2018 | Ahmed et al. | |
| 2019/0075299 | A1* | 3/2019 | Sethuraman | H04N 19/132 |
| 2019/0104306 | A1 | 4/2019 | Wang et al. | |
| 2019/0173929 | A1 | 6/2019 | Guardini et al. | |
| 2019/0208214 | A1 | 7/2019 | Mao et al. | |
| 2019/0335192 | A1 | 10/2019 | Otto et al. | |
| 2020/0099733 | A1* | 3/2020 | Chu | H04N 21/8456 |
| 2020/0236372 | A1 | 7/2020 | Reznik et al. | |

OTHER PUBLICATIONS

Intellectual Property of Office of India, "Examination report under sections 12 & 13 of the Patents Act, 1970 and the Patents Rules, 2003," issued in connection with Indian Patent Application No. 202247016773, dated Jan. 30, 2023, 5 Pages.

Kevin, Spiteri et al. "BOLA: Near-Optimal Bitrate Adaptation for Online Videos" IEEE INFOCOM 2016—The 35thAnnual IEEE International Conference on Computer Communications, Dec. 31, 2016 (Dec. 31, 2016), 9 pages.

International Search Report and Written Opinion for PCT Application No. PCT/CN2019/118301, dated Jul. 28, 2020, 7 pages.

Kevin, Spiteri et al. "BOLA: Near-Optimal Bitrate Adaptation for Online Videos" IEEE/ACM Transactions on Networking 2020 [1]., Jun. 18, 2020 (Jun. 18, 2020), 15 pages.

Japan Patent Office, "Written Opinion," issued in connection with Japanese Patent Application No. 2022-52185, dated Mar. 11, 2024, 4 pages. [English Translation Included].

Japan Patent Office, "Decision to Grant a Patent," issued in connection with Japanese Patent Application No. 2022-52185, dated Apr. 16, 2024, 5 pages. [English Translation Included].

Zhi Li et al, "VMAF—video quality metric alternative to PSNR(AHG9 related)", JVET-D0082-r2, and Joint Video Exploration Team (JVET) of ITU-TSG 16 WP 3 and ISO/IEC JTC 1-/SC 29/WG 11 4th Meeting: Chengdu, CN, Oct. 15-21, 19, 2016.

Yuriy A. Reznik et al., "Optimal Multi-Codec Adaptive Bitrate Streaming" and IEEE2019-2019 IEEE International Conference on Multimedia & Expo Workshops (ICMEW), Jul. 12, 2019, IEEEXplore, URL, https://ieeexplore.ieee.org/document/8795046.

Japanese Patent Office, "Search Report by Registered Search Organization," issued in connection with Japanese Patent Application No. 2022-521285, dated Dec. 7, 2023, 71 pages. [English Translation Included].

Japanese Patent Office, "Notice of Reasons for Refusal," issued in connection with Japanese Patent Application No. 2022-521285, dated Dec. 12, 2023, 12 pages. [English Translation Included].

* cited by examiner

ADAPTIVELY ENCODING VIDEO FRAMES USING CONTENT AND NETWORK ANALYSIS

BACKGROUND

Encoders may compress video frames for transmission. For example, encoders may encode video frames into a compressed form using fewer bits than an original representation. Compression can be either lossy or lossless. Lossless compression reduces bits by identifying and eliminating statistical redundancy. No information is lost in lossless compression. Lossy compression reduces bits by removing unnecessary or less important information

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Real-time video streaming is one of the most important internet video applications. In some examples, real-time video streaming may include cloud video gaming, in-home streaming, remote rendering, and real-time video streaming. In these applications, the associated latency of encoding and sending video may decide user experience, especially for the application that requires user interaction. In many solutions, the video encoder is responsible for encoding the video with the average bit rate that reflects the estimated network bandwidth. The transport is responsible for sending the encoded video with packets, executing the network communication and bandwidth variations, and providing estimated network bandwidth to the video encoder. Although video encoder may be adjusted according to the transport feedback, generally the video encoder and transport are loosely coupled. In particular, video encoder rate control may use a model which depends on gradually rate change. As the result of the gradual change, large delays and frame drops may result if there is a quick network throughput drop. For example, the delays may be five seconds or more. For real time game streaming among other types of applications, these kinds of delays may not be acceptable. In addition, when network throughput improves, existing solutions may not respond fast enough to achieve better quality with newly available bandwidth. Thus, potential bandwidth may be wasted instead of being used to improve quality.

Scalable video coding such as Scalable Video Coding (SVC) for the Advanced Video Coding compression standard (H.264) and HEVC with Scalable Extensions (SHVC) for the High Efficiency Video Coding (HEVC) compression standard H.265 may be used to handle the variable channel conditions. Although scaling video coding can provide quick response to network variations if enough number of layers are used, scalable video coding has a relatively higher encoding complexity and lower compression efficiency in stable network conditions. In particular, in order to handle the real network variations, the number of layers of scalable coding have to be high. As the result, the encoding complexity is high. When a channel is stable, the compression efficiency may be relatively low due to the use of many layers.

The present disclosure relates generally to techniques for adaptively encoding video. Specifically, the techniques described herein include an apparatus, method and system for adaptively encoding video using content and network analysis. An example apparatus includes a network analyzer to predict an instant bitrate based on channel throughput feedback received from a network. The apparatus also includes a content analyzer to generate ladder info based on a received frame. The apparatus further includes an adaptive decision executer to determine a frame rate, a video resolution, and a target frame size based on the predicted instant bitrate and the ladder outputs. The apparatus further includes an encoder to encode the frame based on the frame rate, the video resolution, and the target frame size.

The techniques described herein thus enable very low latency streaming of video with better visual experience. In addition, the techniques described herein may prevent delays and frame drops associated with quick network throughput drops. Moreover, the techniques can be seamlessly integrated into the current video codecs. Experimental training results show that the techniques described herein deliver a strong correlation between actual network bandwidth changes and successfully predicted network channel changes.

Figure 1:
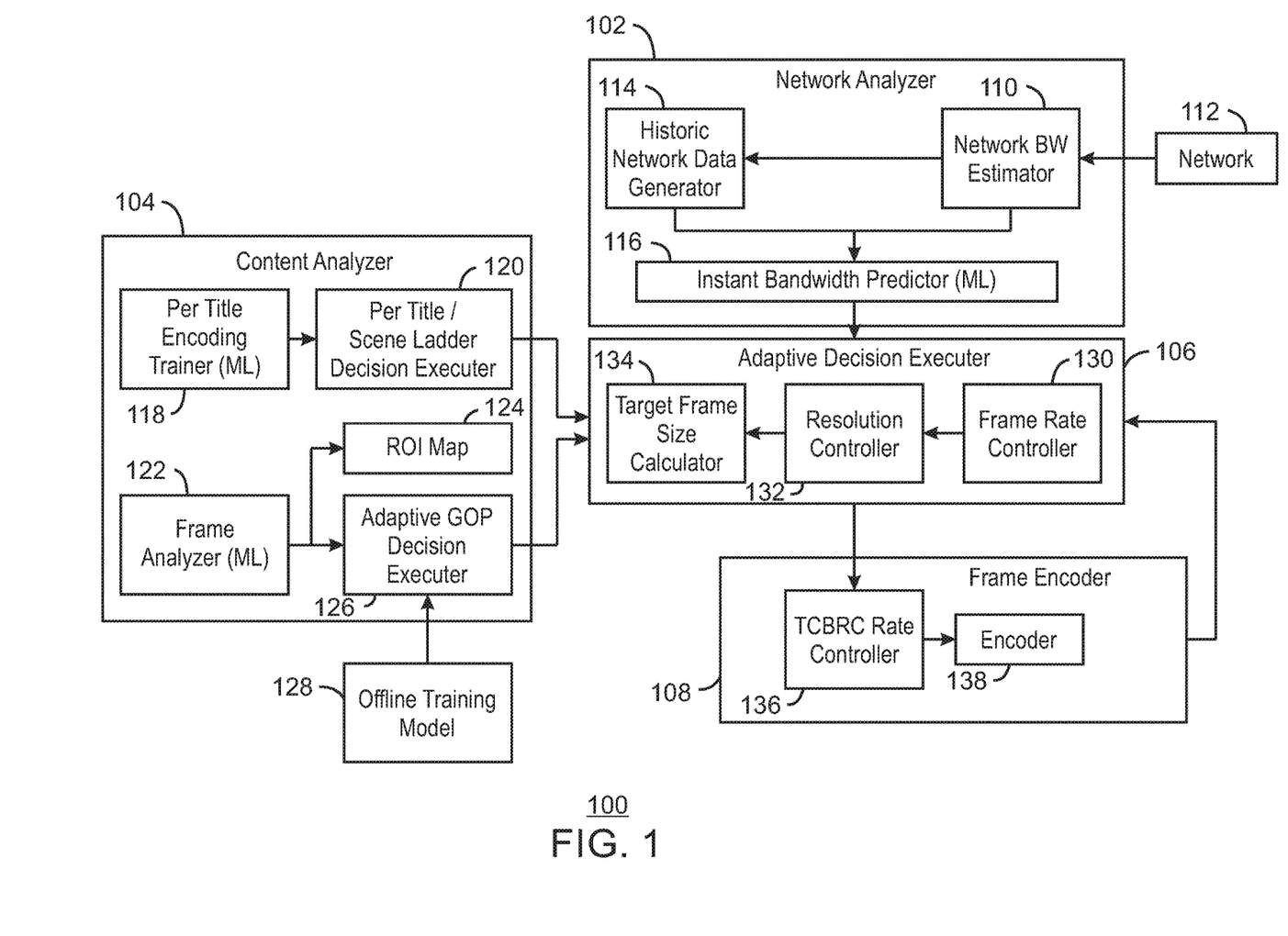
FIG. 1 is a block diagram illustrating an example system for adaptively encoding frames using content and network analysis.

FIG. 1 is a block diagram illustrating an example system for adaptively encoding frames using content and network analysis. The example system 100 can be implemented in the computing device 500 of FIG. 5 using the methods 300 and 400 of FIGS. 3 and 4.

The example system 100 includes a network analyzer 102. The system 100 also includes a content analyzer 104 communicatively coupled to the network analyzer 102. The system further includes an adaptive decision executer 106 communicatively coupled to the network analyzer 102 and the content analyzer 104. The system 100 includes a frame encoder 108 communicatively coupled to the content analyzer 104 and the adaptive decision executer 106. The network analyzer 102 includes a network bandwidth estimator 110. The network bandwidth estimator 110 is communicatively coupled to a network 112. The network analyzer 102 also includes a historic network data generator 114 communicatively coupled to the network bandwidth estimator 110. The network analyzer 102 also further includes an instant bandwidth predictor 116 communicatively coupled to the network bandwidth estimator 110 and the historic network data generator 114. For example, the instant bandwidth predictor 116 may be a neural network trained using machine learning (ML).

The content analyzer 104 includes a per title encoding trainer 118. For example, the per title encoding trainer 118 may be a neural network. The content analyzer 104 also includes a per title/scene ladder decision executer 120. The content analyzer 104 also further includes a frame analyzer 122. For example, the frame analyzer 122 may also be a neural network trained using machine learning (ML). The frame analyzer 122 is shown generating a region of interest map 124. The content analyzer 104 further includes an adaptive group of pictures (GOP) decision executer 126 communicatively coupled to the frame analyzer 122. The adaptive GOP decision executer 126 is shown receiving an offline training model 128.

The adaptive decision executer 106 includes a frame rate controller 130. The adaptive decision executer 106 also includes a resolution controller 312 communicatively coupled to the frame rate controller 130. The adaptive decision executer 106 also further includes a target frame size calculator 134 communicatively coupled to the resolution controller 312.

The frame encoder 108 includes a transport controlled bitrate control (TCBRC) rate controller 136. The frame encoder 108 also includes an encoder 138 communicatively coupled to the TCBRC rate controller 136.

In the example of FIG. 1, the network analyzer 102 can predict a future channel bandwidth change based on the channel feedback from a network 112. For example, the network analyzer 102 can predict a future channel bandwidth change using an instant bandwidth predictor 116, which may be a machine learning algorithm. In addition, the content analyzer 104 can analyze video contents to find the optimal video resolution and frame rate for each bit rate. For example, the content analyzer 104 can analyze video frames via the frame analyzer 122, which may also be a machine learning algorithm. During the encoding process, the adaptive decision executer 106 can decide a target frame size, video resolution and frame rate on the fly. The encoder 138 can then encode the frames based on the target frame size, video resolution and frame rate. The encoding process is thus tightly coupled to the transport and adjusted according to real time channel conditions from the network analyzer 102 and content analysis from the content analyzer 104.

For example, the network analyzer 102 can receive the channel throughput feedback from the network 112. The network bandwidth (BW) estimator 110 can estimate the bandwidth available on the network 112 based on the channel throughput feedback. The historic network data generator 114 can generate historic network data based on estimated bandwidth over time. For example, the historic network data generator 114 can generate historic network data based on a predetermined number of past frames, such as the previous 20 frames. In some examples, the instant bandwidth predictor 116 can predict an instant bitrate by combining the historic network data. In various examples, when a next channel feedback is received from the network 112, the instant bandwidth predictor 116 can modify a previous prediction and generate a new prediction. The instant bandwidth predictor 116 can provide the predicted instant bitrate to the adaptive decision executer 106.

In various examples, the content analyzer 104 includes per title encoding trainer 118 and frame analyzer 122. The per title encoding trainer 118 can perform offline training on a set of received training videos. For example, the per title encoding trainer 118 can perform offline training on a set of most popular video games to find the optimal video resolution and frame rate for each video segment for each bit rate ladder. The frame analyzer 122 can provide on an on-the-fly analysis of each frame in real time with no latency. As one example, for game content, the frame analyzer 122 can leverage information provided from a rendering application program interface (API) and a hardware (HW) counter generated from a render call. In various examples, the outputs from 122 are used to generate a region of interest map in 124, and a GOP structure is decided by adaptive GOP decision executer 126. In some examples, the content analyzer 104 can combine the analysis result with an offline trained model 128 to find the optimal video resolutions and frame rates for each video segment for each bit rate ladder. For example, in the cloud gaming area, some popular game titles may be most frequently played. Providing better quality for these more popular games may therefore be worth expending additional resources. In various examples, the per-title encoding training may be designed for this objective. For example, during a training process, each game title may be encoded with multiple bitrates, multiple resolutions and several different frame rates. Then, a machine learning algorithm may be used to analyze the quality of the encoded videos with same bitrate. For example, the encoded videos may have the same bitrate, but with different combinations of resolution and frame rate. For each video segment with certain bitrate, the best combinations of resolution and frame rate may be selected. After the training process, content analyzer 104 may build a checkup table to contain ladder info for each segment with each preselected bitrate. For example, the ladder info may include the bitrate adaptive resolution and frame rate selection for each segment with each preselected bitrate. An example checkup table with bitrate info for various example games at bitrates of 2 megabits per second (Mbps) to 8 Mbps is shown in Table 1.

TABLE 1

| Bitrate Ladder with Bitrate Info for Games | | | | | | | |
|---|---|---|---|---|---|---|---|
| | 2M | 3M | 4M | 5M | 6M | 7M | 8M | 9M |
| Game_1 | 1280 × 720 | 1280 × 720 | 1920 × 1080 | 1920 × 1080 | 1920 × 1080 | 1920 × 1080 | 1920 × 1080 | 1920 × 1080 |
| Game_2 | 1280 × 720 | 1280 × 720 | 1280 × 720 | 1920 × 1080 | 1920 × 1080 | 1920 × 1080 | 1920 × 1080 | 1920 × 1080 |
| Game_3 | 1920 × 1080 | 1920 × 1080 | 1920 × 1080 | 1920 × 1080 | 1920 × 1080 | 1920 × 1080 | 1920 × 1080 | 1920 × 1080 |
| Game_4 | 1280 × 720 | 1280 × 720 | 1920 × 1080 | 1920 × 1080 | 1920 × 1080 | 1920 × 1080 | 1920 × 1080 | 1920 × 1080 |
| Game_5 | 1280 × 720 | 1920 × 1080 | 1920 × 1080 | 1920 × 1080 | 1920 × 1080 | 1920 × 1080 | 1920 × 1080 | 1920 × 1080 |
| Game_6 | 1920 × 1080 | 1920 × 1080 | 1920 × 1080 | 1920 × 1080 | 1920 × 1080 | 1920 × 1080 | 1920 × 1080 | 1920 × 1080 |

TABLE 1-continued

Bitrate Ladder with Bitrate Info for Games

|  | 2M | 3M | 4M | 5M | 6M | 7M | 8M | 9M |
|---|---|---|---|---|---|---|---|---|
| Game_7 | 1280 × 720 | 1280 × 720 | 1280 × 720 | 1280 × 720 | 1280 × 720 | 1280 × 720 | 1280 × 720 | 1920 × 1080 |
| Game_8 | 1280 × 720 | 1920 × 1080 | 1920 × 1080 | 1920 × 1080 | 1920 × 1080 | 1920 × 1080 | 1920 × 1080 | 1920 × 1080 |
| Game_9 | 1280 × 720 | 1280 × 720 | 1280 × 720 | 1280 × 720 | 1280 × 720 | 1280 × 720 | 1280 × 720 | 1920 × 1080 |

In the example of Table 1, a best quality combination for each bitrate was generated using a calculated peak signal-to-noise ratio (PSNR) for each of the game titles. Combinations that are bolded indicate using a reduced resolution of 1280×720 for rendering rather than 1920×1080. As shown in Table, for example, Game_7 and Game_9 may use 1280× 720 resolution during rendering for best performance even if the bandwidth available is 7 Mbps or 8 Mbps. For example, the frames may be transmitted at 1280×720 and then upscaled to 1920×1080 after they are decoded at the client device. In this way, latency may be reduced and kept below an acceptable threshold level, such as 100 ms or any other predetermined threshold.

In some examples, the frame analyzer 122 can analyze each frame in real time to determine if there is a scene change and provide a frame complexity index. In various examples, the frame analyzer 122 can also generate a region of interest map to fully leverage encoder capability. For example, a region of interest may be a human face. In some examples, a smaller quantization parameter (QP) may be used for the region of interest to make the face appear with higher definition than a surrounding area. In some examples, more bits may be allocated to scene change frames to increase quality. The frame complexity index may indicate a difficulty of encoding a frame with given number of bits. For example, the complexity index may indicate how many bits are to be used for encoding a frame with a given QP. As one example, for game content, the frame analyzer 122 that generates scene change and frame complexity may be constructed using a fully connected layer with 30 HW counters as inputs.

The adaptive decision executer 106 can determine a frame rate, a video resolution, and a target frame size according to the predicted instant bitrate and the ladder info output from the content analyzer 104. For example, after the content analysis and network analysis are completed, the estimated instant bitrate and the ladder info are sent to the adaptive decision executer 106. Based on the estimated instant bitrate and the ladder info, the adaptive decision executer 106 can select a frame rate and video resolution. For example, if the network analyzer 102 predicts that 4 Mbps will be available and the content analyzer 104 indicates that 4 Mbps is a particular best combination of frame rate and resolution, then the indicated frame rate and resolution may be used at a bitrate of 4 Mbps. For example, a resolution can be looked up in a checkup table for a particular game or application and the frame rate can be chosen accordingly based on the optimal resolution. In another example, if the network analyzer 102 indicates that 2 Mbps are available, then the best combination of frame rate and resolution for 2 Mbps may be used instead. Then, the adaptive decision executer 106 can calculate a target frame size based on the frame rate and video resolution. As one example, if the estimated instant bitrate is BR1 and the frame rate is FR1, the target frame size is BR1/FR1. If the FR1 is reduced by half, the target frame size may be increased by 100%. Thus, In various examples, another factor may also be utilized to decide the frame rate and video resolution when the content analysis is not available. For example, this factor may be the combination of a QP value and the generated bits of previous encoded frame. In some examples, the adaptive decision executer 106 can reduce the video resolution for a current frame in response to detecting that the QP value is larger than a threshold and the previous generated bits are larger or equal to the target frame size. In various examples, the adaptive decision executer 106 can apply a frame rate change in response to detecting that a resolution normalized instant bitrate is less than a threshold and the QP value is larger than a threshold. For example, the frame rate change may be a frame drop.

The frame encoder 108 can encode video frame based on the frame rate, the video resolution, and the target frame size. For example, the TCBRC rate controller 136 can derive a quantization parameter for the encoding of current frame. The encoder 138 may then encode the frame based on the derived quantization parameter. In some examples, the encoder 138 can feed back the QP used for the current frame to the adaptive decision executer 106 to be used for decisions on subsequent frames. In some examples, the adaptive decision executer 106 can use the QP of the current frame when determining frame rates, resolutions, and target frames sizes of subsequent frames. For example, if the QP is 50 then the adaptive decision executer 106 can take into account that the QP cannot be raised any further to apply more compression. Thus, as one example, the subsequent frame rate may be reduced if the predicted instant bitrate drops.

In this manner, the latency may be kept below a threshold level. As one example, the latency of the transmitted frames may never exceed 100 milliseconds (ms). After the frames are transmitted at a low latency to the client device, the frames may also be upscaled in order to provide better visual appearance. For example, frames transmitted at 1280×720 may be upscaled to 1920×1080 for display on a monitor of the client device after the frames are decoded.

The diagram of FIG. 1 is not intended to indicate that the example system 100 is to include all of the components shown in FIG. 1. Rather, the example system 100 can be implemented using fewer or additional components not illustrated in FIG. 1 (e.g., additional models, networks, analyzers, encoders, etc.).

Figure 2:
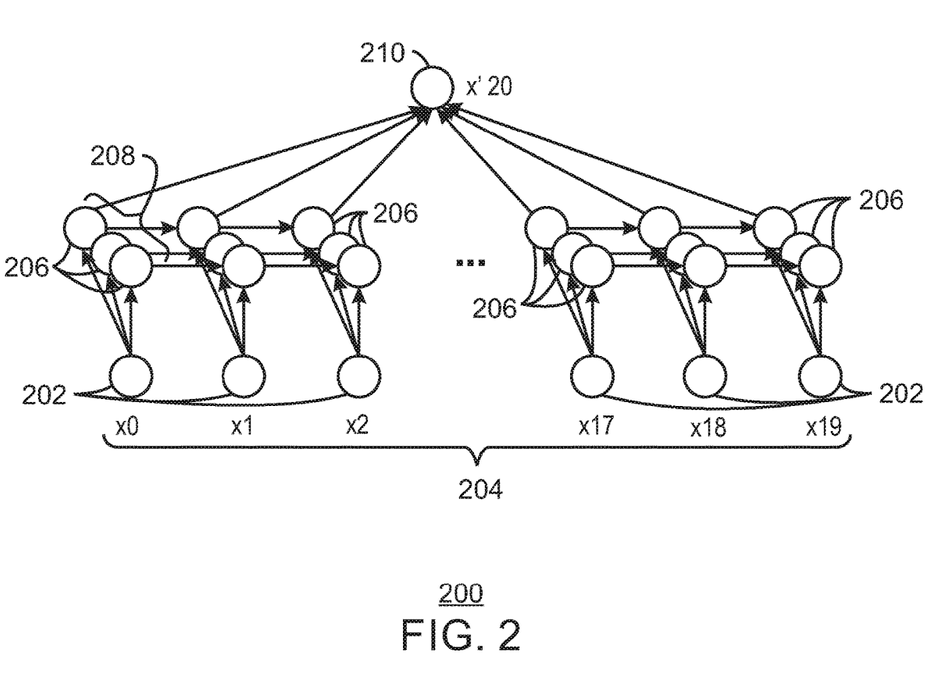
FIG. 2 is a diagram illustrating an example deep learning network for network bandwidth prediction.

FIG. 2 is a block diagram illustrating an example deep learning network for network bandwidth prediction. The example deep learning network 200 can be implemented in the system 100 of FIG. 1 or the computing device 500 in FIG. 5 using the method 300 of FIG. 3. For example, the deep learning network 200 can be used for the instant bandwidth predictor 116 of the network analyzer 102 or the network analyzer 530.

The example deep learning network 200 is a recurrent neural network (RNN). The deep learning network 200 includes inputs 202. For example, the total size of the inputs 204 may be 20. The inputs 202 may correspond to frames x0-x19. As one example, the inputs 202 may be a first package delay for each of the frames x0-x19 and a frame size for each of the frames x0-x19. In some examples, a Web real-time communication (WebRTC) API feedback for the first package delay may be used. In other examples, the Real Time Streaming Protocol (RTSP) network control protocol may be used to obtain the package delays. As one example, frame x0 may represent the current frame, while frames x1-x19 may represent previous frames.

The deep learning network 200 includes interconnected cells 206 that are time sequenced. For example, cells 206 corresponding to frame x1 may be connected to cells 206 corresponding to frame x0. The cells each have a number of features 208. For example, the number 208 of features may be 100.

The deep learning network 200 also includes a dense layer 210 that combines features from all 20 inputs into one cell. For example, the dense layer 210 may be an output prediction based on the inputs 202. As one example, the prediction may be a predicted instant bitrate.

In various examples, a network bandwidth predictor can be constructed using a deep learning algorithm to predict bandwidth based on the feedback from network. For example, the network bandwidth predictor can be constructed to predict bandwidth based mainly on first package transmission time. In some examples, the deep learning network 200 may be a recurrent neural network (RNN) with 20 inputs and a total of 200 weights. For example, the 20 inputs may include one current input and 19 previous inputs.

The diagram of FIG. 2 is not intended to indicate that the example deep learning network 200 is to include all of the components shown in FIG. 2. Rather, the example deep learning network 200 can be implemented using fewer or additional components not illustrated in FIG. 2 (e.g., additional layers, inputs, features, etc.).

Figure 3:
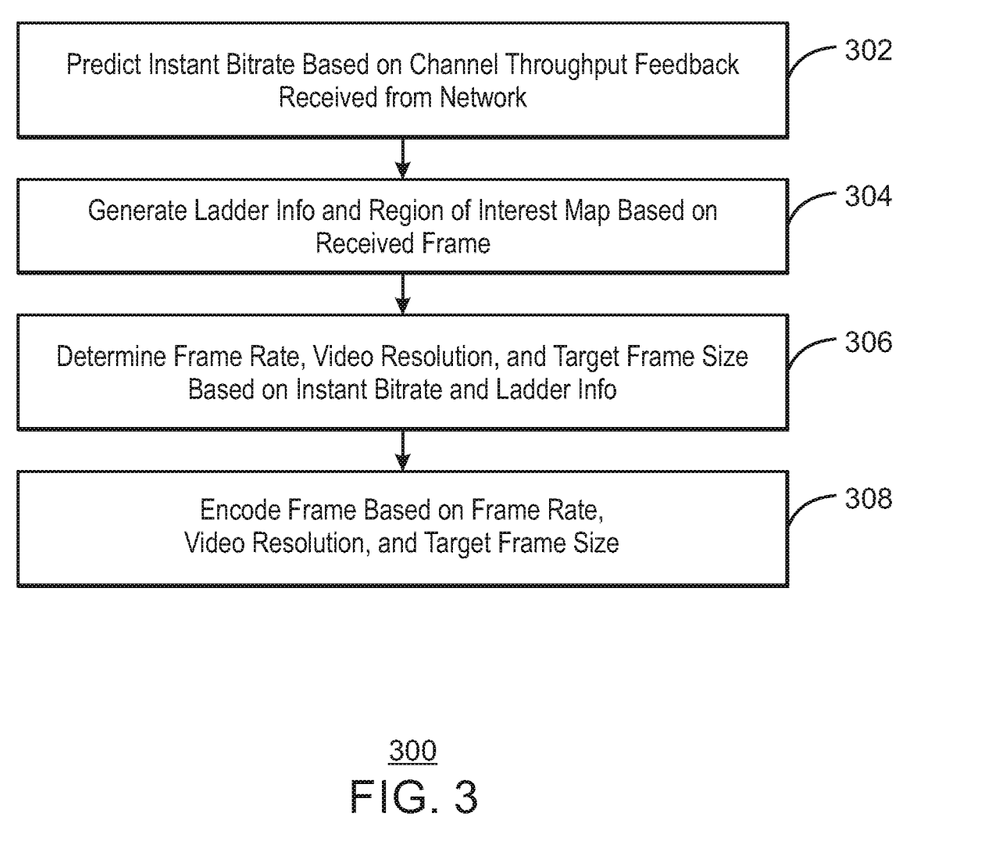
FIG. 3 is a flow chart illustrating a method for adaptively encoding frames using content and network analysis.

FIG. 3 is a flow chart illustrating a method for adaptively encoding frames using content and network analysis. The example method 300 and be implemented in the system 100 of FIG. 1, the computing device 500 of FIG. 5, or the computer readable media 600 of FIG. 6. In some examples, the method 300 can be implemented using the deep learning network 200 of FIG. 2.

At block 302, a processor predicts an instant bitrate based on channel throughput feedback received from a network. In some examples, the processor can predict the instant bitrate is based on the received channel throughput feedback and received historic data. In some examples, the processor can predict the instant bitrate is based on a first package transmission time. For example, the channel throughput feedback may be received in the form of package transmission times.

At block 304, the processor generates ladder info based on a received frame. In some examples, the processor can perform offline training to generate an optimal video resolution and frame rate at a plurality of predetermined preselected bitrates for a received set of videos. In various examples, the processor can detect a scene change in the frame and generating a frame complexity index for the frame. For example, the scene change and frame complexity can be detected based on the frame via a neural network with a fully connected layer.

At block 306, the processor determines a frame rate, a video resolution, and a target frame size based on the predicted instant bitrate and the ladder info. For example, the processor can select a frame rate and video resolution based on the predicted instant bitrate and the ladder info. As one example, the ladder info may include target video resolutions for a variety of game titles given a number of instant bitrates. For example, the ladder info may be received from a checkup table built using the method 400 of FIG. 4. The processor may then calculate a target frame size based on the frame rate and the video resolution. For example, the target frame size may be measured in bits.

At block 308, the processor encodes the frame based on the frame rate, the video resolution, and the target frame size. In various examples, the processor can generate a quantization parameter based on the frame rate, the video resolution, and the target frame size, and encode the frame based on the quantization parameter. For example, the processor can select the frame rate and the video resolution based on the predicted instant bitrate and the ladder info, and calculating the target frame rate based on the frame rate and the video resolution. In some examples, the processor can select the frame rate and the video resolution based on a quantization parameter of a previously encoded frame and generated bits of the previously encoded frame in response to detecting that the ladder info is empty. For example, the ladder info may not be available for a particular frame.

This process flow diagram is not intended to indicate that the blocks of the example method 300 are to be executed in any particular order, or that all of the blocks are to be included in every case. Further, any number of additional blocks not shown may be included within the example method 300, depending on the details of the specific implementation. For example, the encoded frames may be transmitted to a client device for display.

Figure 4:
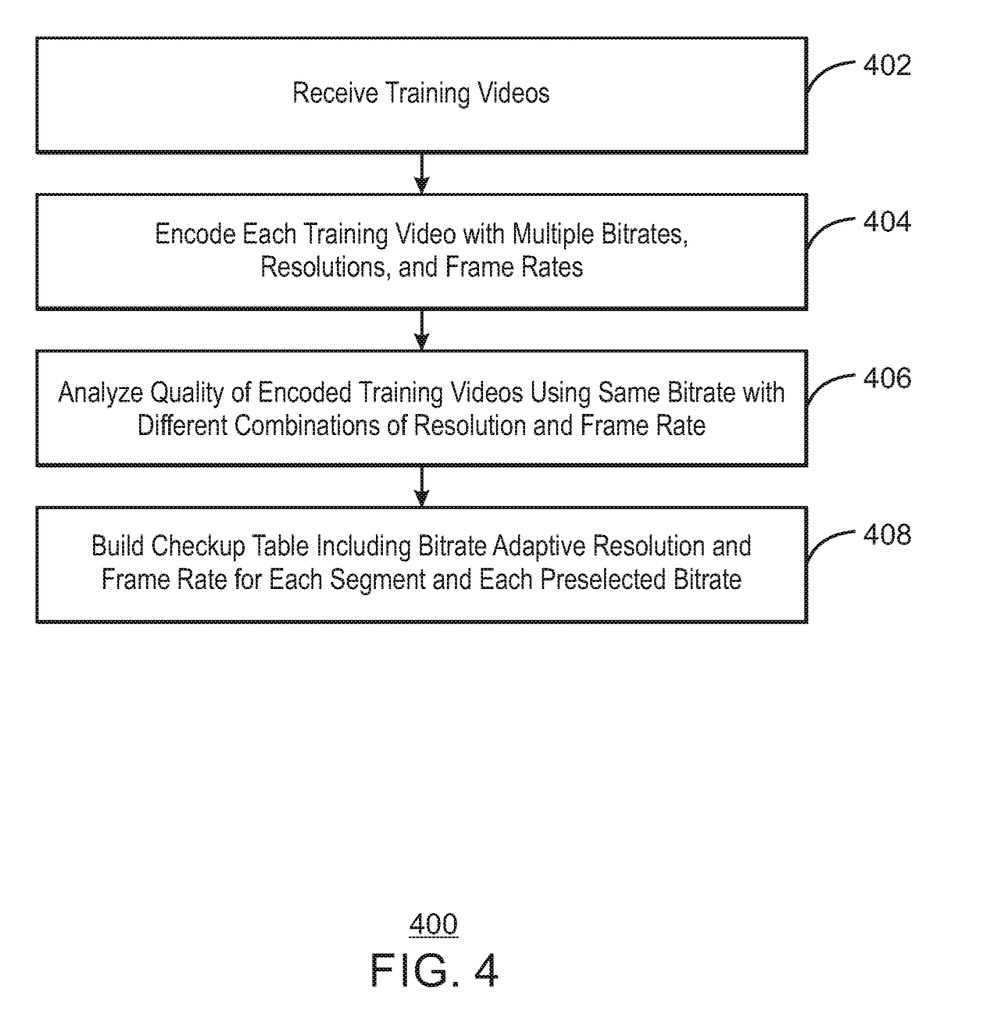
FIG. 4 is a flow chart illustrating a method for building a checkup table.

FIG. 4 is a flow chart illustrating a method for building a checkup table. The example method 400 and be implemented in the system 100 of FIG. 1, the computing device 500 of FIG. 5, or the computer readable media 600 of FIG. 6.

At block 402, a processor receives a number of training videos. For example, the training videos may be streams of popular games or of applications in use.

At block 404, the processor encodes each of the plurality of training videos with multiple bit rates, resolutions, and frame rates. For example, the processor can encode a number of streams of video games at a number of bitrates, a number of resolutions, and a number of frame rates.

At block 406, the processor analyzes a quality of the encoded training videos using a same bitrate with different combinations of resolutions and frame rates. For example, the quality of the encoded videos may be analyzed using PSNR. In various examples, combinations of resolutions and frame rates with the best PSNR may be selected.

At block 408, the processor builds a checkup table including a bitrate adaptive resolution and frame rate for each training video and each of a number of preselected bitrates. For example, the processor can build a checkup table including bitrate adaptive resolution and frame rate selections for each video game at preselected bitrates based on a machine learning analysis of quality of encoded videos with different combinations of resolutions and frame rates at the same bitrate.

This process flow diagram is not intended to indicate that the blocks of the example method 400 are to be executed in any particular order, or that all of the blocks are to be included in every case. Further, any number of additional blocks not shown may be included within the example method 400, depending on the details of the specific implementation.

Figure 5:
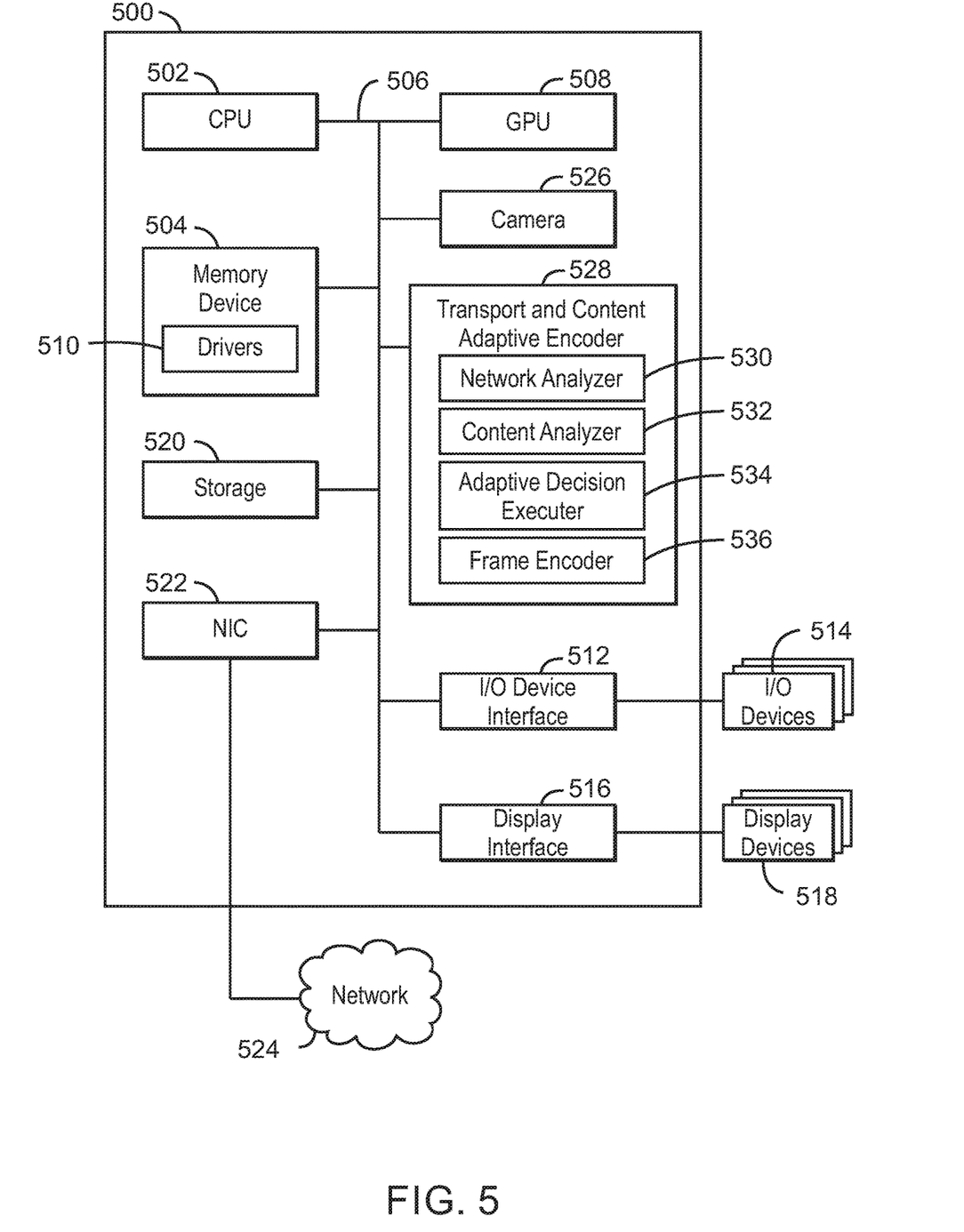
FIG. 5 is block diagram illustrating an example computing device that can adaptively encode frames using content and network analysis.

Referring now to FIG. 5, a block diagram is shown illustrating an example computing device that can adaptively encode frames using content and network analysis. The computing device 500 may be, for example, a laptop computer, desktop computer, tablet computer, mobile device, or wearable device, among others. In some examples, the computing device 500 may be a cloud computing device that renders and transmits video streams for video gaming or other applications. The computing device 500 may include a central processing unit (CPU) 502 that is configured to execute stored instructions, as well as a memory device 504 that stores instructions that are executable by the CPU 502. The CPU 502 may be coupled to the memory device 504 by a bus 506. Additionally, the CPU 502 can be a single core processor, a multi-core processor, a computing cluster, or any number of other configurations. Furthermore, the computing device 500 may include more than one CPU 502. In some examples, the CPU 502 may be a system-on-chip (SoC) with a multi-core processor architecture. In some examples, the CPU 502 can be a specialized digital signal processor (DSP) used for image processing. The memory device 504 can include random access memory (RAM), read only memory (ROM), flash memory, or any other suitable memory systems. For example, the memory device 504 may include dynamic random access memory (DRAM).

The memory device 504 can include random access memory (RAM), read only memory (ROM), flash memory, or any other suitable memory systems. For example, the memory device 504 may include dynamic random access memory (DRAM).

The computing device 500 may also include a graphics processing unit (GPU) 508. As shown, the CPU 502 may be coupled through the bus 506 to the GPU 508. The GPU 508 may be configured to perform any number of graphics operations within the computing device 500. For example, the GPU 508 may be configured to render or manipulate graphics images, graphics frames, videos, or the like, to be displayed to a user of the computing device 500.

The memory device 504 can include random access memory (RAM), read only memory (ROM), flash memory, or any other suitable memory systems. For example, the memory device 504 may include dynamic random access memory (DRAM). The memory device 504 may include device drivers 510 that are configured to execute the instructions for training multiple convolutional neural networks to perform sequence independent processing. The device drivers 510 may be software, an application program, application code, or the like.

The CPU 502 may also be connected through the bus 506 to an input/output (I/O) device interface 512 configured to connect the computing device 500 to one or more I/O devices 514. The I/O devices 514 may include, for example, a keyboard and a pointing device, wherein the pointing device may include a touchpad or a touchscreen, among others. The I/O devices 514 may be built-in components of the computing device 500, or may be devices that are externally connected to the computing device 500. In some examples, the memory 504 may be communicatively coupled to I/O devices 514 through direct memory access (DMA).

The CPU 502 may also be linked through the bus 506 to a display interface 516 configured to connect the computing device 500 to a display device 518. The display device 518 may include a display screen that is a built-in component of the computing device 500. The display device 518 may also include a computer monitor, television, or projector, among others, that is internal to or externally connected to the computing device 500.

The computing device 500 also includes a storage device 520. The storage device 520 is a physical memory such as a hard drive, an optical drive, a thumbdrive, an array of drives, a solid-state drive, or any combinations thereof. The storage device 520 may also include remote storage drives.

The computing device 500 may also include a network interface controller (NIC) 522. The NIC 522 may be configured to connect the computing device 500 through the bus 506 to a network 524. The network 524 may be a wide area network (WAN), local area network (LAN), or the Internet, among others. In some examples, the device may communicate with other devices through a wireless technology. For example, the device may communicate with other devices via a wireless local area network connection. In some examples, the device may connect and communicate with other devices via Bluetooth® or similar technology.

The computing device 500 further includes a camera 526. For example, the camera 526 may include one or more imaging sensors. In some example, the camera 526 may include a processor to generate video frames.

The computing device 500 further includes a transport and content adaptive encoder 528. For example, the transport and content adaptive encoder 528 can be used to adaptively encode frames based on content and network analysis. The transport and content adaptive encoder 528 can include a network analyzer 530, a content analyzer 532, an adaptive decision executer 534, and a frame encoder 536. In some examples, each of the components 530-536 of the transport and content adaptive encoder 528 may be a microcontroller, embedded processor, or software module. The network analyzer 530 can predict an instant bitrate based on channel throughput feedback received from a network. For example, the network analyzer 530 can predict the instant bitrate on the received channel throughput feedback and received historic data. In some examples, the network analyzer 530 can predict the instant bitrate based on a first package transmission time. For example, the network analyzer 530 may include a deep learning neural network trained to predict the instant bitrate based on a first package transmission time. The content analyzer 532 can generate ladder info based on a received frame. In some examples, the content analyzer 532 can perform offline training to generate an optimal video resolution and frame rate at a plurality of predetermined preselected bitrates for a received set of videos. In various examples, the content analyzer 532 can analyze received frames in real time to detect a scene change in the frame and generate a frame complexity index for the frame. For example, the content analyzer 532 may include a frame analyzer including a fully connected layer with a plurality of hardware counters as inputs. As one example, the frame analyzer may be a deep learning neural network. In some examples, the content analyzer 532 may include per title encoding trainer to build a checkup table including a bitrate adaptive resolution and frame rate for each training video and each of a plurality of preselected bitrates. The adaptive decision executer 534 can determine a frame rate, a video resolution, and a target frame size based on the predicted instant bitrate and the ladder outputs. In some examples, the adaptive decision executer 534 can select the frame rate and the video resolution based on the predicted instant bitrate and the ladder info, and calculate the target frame rate based on the frame rate and the video resolution. In various examples, the adaptive decision executer 534 can alternatively select the frame rate and the video resolution based on a quantization parameter of a previously encoded frame and generated bits of the previously encoded frame in response to detecting that the ladder info is empty. The frame encoder 536 can encode the frame based on the frame rate, the video resolution, and the target frame size.

The block diagram of FIG. 5 is not intended to indicate that the computing device 500 is to include all of the components shown in FIG. 5. Rather, the computing device 500 can include fewer or additional components not illustrated in FIG. 5, such as additional buffers, additional processors, and the like. The computing device 500 may include any number of additional components not shown in FIG. 5, depending on the details of the specific implementation. For example, the computing device 300 can also include a rate controller to generate a quantization parameter based on the frame rate, the video resolution, and the target frame size. The encoder 536 may then encode the frame based on the quantization parameter. Furthermore, any of the functionalities of the network analyzer 530, the content analyzer 532, the adaptive decision executer 534, and the frame encoder 536, may be partially, or entirely, implemented in hardware and/or in the processor 502. For example, the functionality may be implemented with an application specific integrated circuit, in logic implemented in the processor 502, or in any other device. In addition, any of the functionalities of the CPU 502 may be partially, or entirely, implemented in hardware and/or in a processor. For example, the functionality of the transport and content adaptive encoder 528 may be implemented with an application specific integrated circuit, in logic implemented in a processor, in logic implemented in a specialized graphics processing unit such as the GPU 508, or in any other device.

Figure 6:
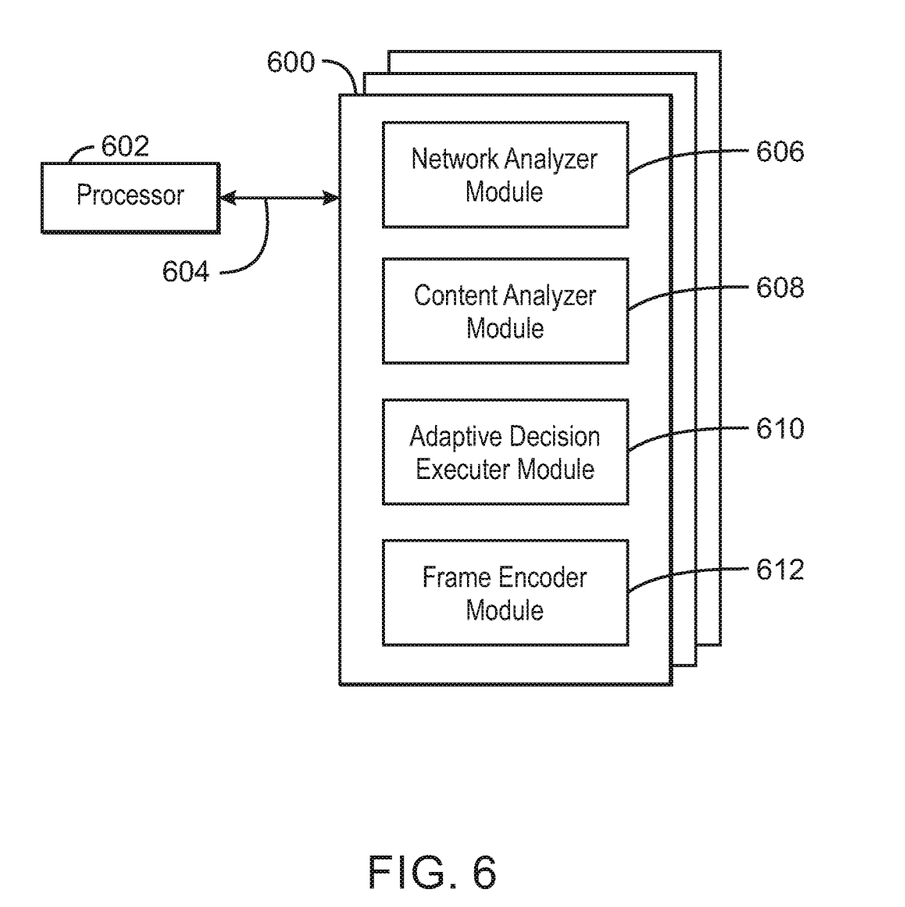
FIG. 6 is a block diagram showing computer readable media that store code for adaptively encoding frames using content and network analysis.

FIG. 6 is a block diagram showing computer readable media 600 that store code for adaptively encoding frames using content and network analysis. The computer readable media 600 may be accessed by a processor 602 over a computer bus 604. Furthermore, the computer readable medium 600 may include code configured to direct the processor 602 to perform the methods described herein. In some embodiments, the computer readable media 600 may be non-transitory computer readable media. In some examples, the computer readable media 600 may be storage media.

The various software components discussed herein may be stored on one or more computer readable media 600, as indicated in FIG. 6. For example, a network analyzer module 606 may be configured to predict an instant bitrate based on channel throughput feedback received from a network. For example, the network analyzer module 606 may be configured to predict the instant bitrate on the received channel throughput feedback and received historic data. In some examples, the analyzer module 606 may be configured to predict the instant bitrate based on a first package transmission time. A content analyzer module 608 may be configured to generate ladder info based on a received frame. In some examples, the content analyzer module 608 may be configured to perform offline training to generate an optimal video resolution and frame rate at a plurality of predetermined preselected bitrates for a received set of videos. In various examples, the content analyzer module 608 may be configured to detect a scene change in the frame and generate a frame complexity index for the frame. For example, the content analyzer module 608 may be configured to detect a scene change and a frame complexity based on the frame via a neural network with a fully connected layer. In various examples, the content analyzer module 608 may be configured to build a checkup table including a bitrate adaptive resolution and frame rate for each training video and each of a plurality of preselected bitrates. An adaptive decision executer module 610 may be configured to determine a frame rate, a video resolution, and a target frame size based on the predicted instant bitrate and the ladder outputs. For example, the adaptive decision executer module 610 may be configured to select the frame rate and the video resolution based on the predicted instant bitrate and the ladder info, and calculate the target frame rate based on the frame rate and the video resolution. In some examples, the adaptive decision executer module 610 may be configured to select the frame rate and the video resolution based on a quantization parameter of a previously encoded frame and generated bits of the previously encoded frame in response to detecting that the ladder info is empty. A frame encoder module 612 may be configured to encode the frame based on the frame rate, the video resolution, and the target frame size.

The block diagram of FIG. 6 is not intended to indicate that the computer readable media 600 is to include all of the components shown in FIG. 6. Further, the computer readable media 600 may include any number of additional components not shown in FIG. 6, depending on the details of the specific implementation. For example, the computer readable media 600 may further include a rate controller module configured to generate a quantization parameter based on the frame rate, the video resolution, and the target frame size. The frame encoder module 612 may encode the frame based on the quantization parameter.

EXAMPLES

Example 1 is an apparatus for adaptively encoding video frames. The apparatus includes a network analyzer to predict an instant bitrate based on channel throughput feedback received from a network. The apparatus also includes a content analyzer to generate ladder info based on a received frame. The apparatus further includes an adaptive decision executer to determine a frame rate, a video resolution, and a target frame size based on the predicted instant bitrate and the ladder outputs. The apparatus also further includes an encoder to encode the frame based on the frame rate, the video resolution, and the target frame size.

Example 2 includes the apparatus of example 1, including or excluding optional features. In this example, the apparatus includes a rater controller to generate a quantization parameter based on the frame rate, the video resolution, and the target frame size, wherein the encoder is to encode the frame based on the quantization parameter.

Example 3 includes the apparatus of any one of examples 1 to 2, including or excluding optional features. In this example, the network analyzer is to predict the instant bitrate on the received channel throughput feedback and received historic data.

Example 4 includes the apparatus of any one of examples 1 to 3, including or excluding optional features. In this example, the network analyzer includes a deep learning neural network trained to predict the instant bitrate based on a first package transmission time.

Example 5 includes the apparatus of any one of examples 1 to 4, including or excluding optional features. In this example, the content analyzer includes a per title encoding trainer to perform offline training to generate an optimal video resolution and frame rate at a number of predetermined preselected bitrates for a received set of videos.

Example 6 includes the apparatus of any one of examples 1 to 5, including or excluding optional features. In this example, the content analyzer includes a frame analyzer to analyze the frame in real time to detect a scene change in the frame and generate a frame complexity index for the frame.

Example 7 includes the apparatus of any one of examples 1 to 6, including or excluding optional features. In this example, the content analyzer includes a frame analyzer, the frame analyzer including a fully connected layer with a number of hardware counters as inputs.

Example 8 includes the apparatus of any one of examples 1 to 7, including or excluding optional features. In this example, the adaptive decision executer is to select the frame rate and the video resolution based on the predicted instant bitrate and the ladder info, and calculate the target frame rate based on the frame rate and the video resolution.

Example 9 includes the apparatus of any one of examples 1 to 8, including or excluding optional features. In this example, the adaptive decision executer is to select the frame rate and the video resolution based on a quantization parameter of a previously encoded frame and generated bits of the previously encoded frame in response to detecting that the ladder info is empty.

Example 10 includes the apparatus of any one of examples 1 to 9, including or excluding optional features. In this example, the content analyzer includes a per title encoding trainer to build a checkup table including a bitrate adaptive resolution and frame rate for each training video and each of a number of preselected bitrates.

Example 11 is a method for adaptively encoding video frames. The method includes predicting, via a processor, an instant bitrate based on channel throughout feedback received from a network. The method includes generating, via the processor, ladder info based on a received frame. The method includes determining, via the processor, a frame rate, a video resolution, and a target frame size based on the predicted instant bitrate and the ladder outputs. The method includes encoding, via the processor, the frame based on the frame rate, the video resolution, and the target frame size.

Example 12 includes the method of example 11, including or excluding optional features. In this example, encoding the frame includes generating a quantization parameter based on the frame rate, the video resolution, and the target frame size, and encoding the frame based on the quantization parameter.

Example 13 includes the method of any one of examples 11 to 12, including or excluding optional features. In this example, predicting the instant bitrate is based on the received channel throughput feedback and received historic data.

Example 14 includes the method of any one of examples 11 to 13, including or excluding optional features. In this example, predicting the instant bitrate is based on a first package transmission time.

Example 15 includes the method of any one of examples 11 to 14, including or excluding optional features. In this example, the method includes performing offline training to generate an optimal video resolution and frame rate at a number of predetermined preselected bitrates for a received set of videos.

Example 16 includes the method of any one of examples 11 to 15, including or excluding optional features. In this example, the method includes detecting a scene change in the frame and generating a frame complexity index for the frame.

Example 17 includes the method of any one of examples 11 to 16, including or excluding optional features. In this example, the method includes detecting, via a neural network with a fully connected layer, a scene change and a frame complexity based on the frame.

Example 18 includes the method of any one of examples 11 to 17, including or excluding optional features. In this example, the method includes selecting the frame rate and the video resolution based on the predicted instant bitrate and the ladder info, and calculating the target frame rate based on the frame rate and the video resolution.

Example 19 includes the method of any one of examples 11 to 18, including or excluding optional features. In this example, the method includes selecting the frame rate and the video resolution based on a quantization parameter of a previously encoded frame and generated bits of the previously encoded frame in response to detecting that the ladder info is empty.

Example 20 includes the method of any one of examples 11 to 19, including or excluding optional features. In this example, the method includes receiving a number of training videos; encoding each of the number of training videos with a number of bit rates, resolutions, and frame rates. The method also includes analyzing a quality of the encoded training videos using a same bitrate with different combinations of resolutions and frame rates. The method also further includes and building a checkup table including a bitrate adaptive resolution and frame rate for each training video and each of a number of preselected bitrates.

Example 21 is a system for adaptively encoding video frames. The system includes means for predicting an instant bitrate based on channel throughput feedback received from a network. The system includes means for generating ladder info based on a received frame. The system includes means for determining a frame rate, a video resolution, and a target frame size based on the predicted instant bitrate and the ladder outputs; and means for encoding the frame based on the frame rate, the video resolution, and the target frame size.

Example 22 includes the system of example 21, including or excluding optional features. In this example, the system includes means for generating a quantization parameter based on the frame rate, the video resolution, and the target frame size, wherein the encoder is to encode the frame based on the quantization parameter.

Example 23 includes the system of any one of examples 21 to 22, including or excluding optional features. In this example, the means for predicting the instant bitrate is to predict the instant bitrate on the received channel throughput feedback and received historic data.

Example 24 includes the system of any one of examples 21 to 23, including or excluding optional features. In this example, the means for predicting the instant bitrate includes a deep learning neural network trained to predict the instant bitrate based on a first package transmission time.

Example 25 includes the system of any one of examples 21 to 24, including or excluding optional features. In this example, the means for generating the ladder info includes a per title encoding trainer to perform offline training to generate an optimal video resolution and frame rate at a number of predetermined preselected bitrates for a received set of videos.

Example 26 includes the system of any one of examples 21 to 25, including or excluding optional features. In this example, the means for generating the ladder info includes a frame analyzer to analyze the frame in real time to detect a scene change in the frame and generate a frame complexity index for the frame.

Example 27 includes the system of any one of examples 21 to 26, including or excluding optional features. In this example, the means for generating the ladder info includes a frame analyzer, the frame analyzer including a fully connected layer with a number of hardware counters as inputs.

Example 28 includes the system of any one of examples 21 to 27, including or excluding optional features. In this example, the means for determining the frame rate, the video resolution, and the target frame size is to select the frame rate and the video resolution based on the predicted instant bitrate and the ladder info, and calculate the target frame rate based on the frame rate and the video resolution.

Example 29 includes the system of any one of examples 21 to 28, including or excluding optional features. In this example, the means for determining the frame rate, the video resolution, and the target frame size is to select the frame rate and the video resolution based on a quantization parameter of a previously encoded frame and generated bits of the previously encoded frame in response to detecting that the ladder info is empty.

Example 30 includes the system of any one of examples 21 to 29, including or excluding optional features. In this example, the means for generating the ladder info includes a per title encoding trainer to build a checkup table including a bitrate adaptive resolution and frame rate for each training video and each of a number of preselected bitrates.

Example 31 is an apparatus for adaptively encoding video frames. The apparatus includes a network analyzer to predict an instant bitrate based on channel throughput feedback received from a network. The apparatus includes a content analyzer to generate ladder info based on a received frame. The apparatus includes an adaptive decision executer to determine a frame rate, a video resolution, and a target frame size based on the predicted instant bitrate and the ladder outputs. The apparatus includes an encoder to encode the frame based on the frame rate, the video resolution, and the target frame size.

Example 32 includes the apparatus of example 31, including or excluding optional features. In this example, the apparatus includes a rater controller to generate a quantization parameter based on the frame rate, the video resolution, and the target frame size, wherein the encoder is to encode the frame based on the quantization parameter.

Example 33 includes the apparatus of any one of examples 31 to 32, including or excluding optional features. In this example, the network analyzer is to predict the instant bitrate on the received channel throughput feedback and received historic data.

Example 34 includes the apparatus of any one of examples 31 to 33, including or excluding optional features. In this example, the network analyzer includes a deep learning neural network trained to predict the instant bitrate based on a first package transmission time.

Example 35 includes the apparatus of any one of examples 31 to 34, including or excluding optional features. In this example, the content analyzer includes a per title encoding trainer to perform offline training to generate an optimal video resolution and frame rate at a number of predetermined preselected bitrates for a received set of videos.

Example 36 includes the apparatus of any one of examples 31 to 35, including or excluding optional features. In this example, the content analyzer includes a frame analyzer to analyze the frame in real time to detect a scene change in the frame and generate a frame complexity index for the frame.

Example 37 includes the apparatus of any one of examples 31 to 36, including or excluding optional features. In this example, the content analyzer includes a frame analyzer, the frame analyzer including a fully connected layer with a number of hardware counters as inputs.

Example 38 includes the apparatus of any one of examples 31 to 37, including or excluding optional features. In this example, the adaptive decision executer is to select the frame rate and the video resolution based on the predicted instant bitrate and the ladder info, and calculate the target frame rate based on the frame rate and the video resolution.

Example 39 includes the apparatus of any one of examples 31 to 38, including or excluding optional features. In this example, the adaptive decision executer is to select the frame rate and the video resolution based on a quantization parameter of a previously encoded frame and generated bits of the previously encoded frame in response to detecting that the ladder info is empty.

Example 40 includes the apparatus of any one of examples 31 to 39, including or excluding optional features. In this example, the content analyzer includes a per title encoding trainer to build a checkup table including a bitrate adaptive resolution and frame rate for each training video and each of a number of preselected bitrates.

Example 41 is at least one computer readable medium for adaptively encoding video frames having instructions stored therein that. The computer-readable medium includes instructions that direct the processor to predict an instant bitrate based on channel throughput feedback received from a network. The computer-readable medium includes instructions that direct the processor to generate ladder info based on a received frame; determine a frame rate, a video resolution, and a target frame size based on the predicted instant bitrate and the ladder outputs. The computer-readable medium includes instructions that direct the processor to encode the frame based on the frame rate, the video resolution, and the target frame size.

Example 42 includes the computer-readable medium of example 41, including or excluding optional features. In this example, the computer-readable medium includes instructions to generate a quantization parameter based on the frame rate, the video resolution, and the target frame size, wherein the encoder is to encode the frame based on the quantization parameter.

Example 43 includes the computer-readable medium of any one of examples 41 to 42, including or excluding optional features. In this example, the computer-readable medium includes instructions to predict the instant bitrate on the received channel throughput feedback and received historic data.

Example 44 includes the computer-readable medium of any one of examples 41 to 43, including or excluding optional features. In this example, the computer-readable medium includes instructions to predict the instant bitrate based on a first package transmission time.

Example 45 includes the computer-readable medium of any one of examples 41 to 44, including or excluding optional features. In this example, the computer-readable medium includes instructions to perform offline training to generate an optimal video resolution and frame rate at a number of predetermined preselected bitrates for a received set of videos.

Example 46 includes the computer-readable medium of any one of examples 41 to 45, including or excluding optional features. In this example, the computer-readable medium includes instructions to analyze the frame in real time to detect a scene change in the frame and generate a frame complexity index for the frame.

Example 47 includes the computer-readable medium of any one of examples 41 to 46, including or excluding optional features. In this example, the computer-readable medium includes instructions to detect a scene change and a frame complexity based on the frame via a neural network with a fully connected layer.

Example 48 includes the computer-readable medium of any one of examples 41 to 47, including or excluding optional features. In this example, the computer-readable medium includes instructions to select the frame rate and the video resolution based on the predicted instant bitrate and the ladder info, and calculate the target frame rate based on the frame rate and the video resolution.

Example 49 includes the computer-readable medium of any one of examples 41 to 48, including or excluding optional features. In this example, the computer-readable medium includes instructions to select the frame rate and the video resolution based on a quantization parameter of a previously encoded frame and generated bits of the previously encoded frame in response to detecting that the ladder info is empty.

Example 50 includes the computer-readable medium of any one of examples 41 to 49, including or excluding optional features. In this example, the computer-readable medium includes instructions to build a checkup table including a bitrate adaptive resolution and frame rate for each training video and each of a number of preselected bitrates.

Not all components, features, structures, characteristics, etc. described and illustrated herein need be included in a particular aspect or aspects. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some aspects have been described in reference to particular implementations, other implementations are possible according to some aspects. Additionally, the arrangement and/or order of circuit elements or other features illustrated in the drawings and/or described herein need not be arranged in the particular way illustrated and described. Many other arrangements are possible according to some aspects.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

It is to be understood that specifics in the aforementioned examples may be used anywhere in one or more aspects. For instance, all optional features of the computing device described above may also be implemented with respect to either of the methods or the computer-readable medium described herein. Furthermore, although flow diagrams and/or state diagrams may have been used herein to describe aspects, the techniques are not limited to those diagrams or to corresponding descriptions herein. For example, flow need not move through each illustrated box or state or in exactly the same order as illustrated and described herein.

The present techniques are not restricted to the particular details listed herein. Indeed, those skilled in the art having the benefit of this disclosure will appreciate that many other variations from the foregoing description and drawings may be made within the scope of the present techniques. Accordingly, it is the following claims including any amendments thereto that define the scope of the present techniques.

What is claimed is:

1. An apparatus for adaptively encoding video frames, comprising:
 a network analyzer to predict an instant bitrate based on channel throughput feedback received from a network;
 a content analyzer to generate ladder info based on a received frame;
 an adaptive decision executer to:
  after a determination that the ladder info is not empty, determine a frame rate, a video resolution, and a target frame size based on the predicted instant bitrate and the ladder outputs; and
  after a determination that the ladder info is empty, determine the frame rate, the video resolution, and the target frame size based on a quantization parameter of a previously encoded frame and generated bits of the previously encoded frame; and
 an encoder to encode the frame based on the frame rate, the video resolution, and the target frame size.

2. The apparatus of claim 1, further including a rater controller to generate a quantization parameter based on the frame rate, the video resolution, and the target frame size, wherein the encoder is to encode the frame based on the quantization parameter.

3. The apparatus of claim 1, wherein the network analyzer is to predict the instant bitrate on the received channel throughput feedback and received historic data.

4. The apparatus of claim 1, wherein the network analyzer includes a deep learning neural network trained to predict the instant bitrate based on a first package transmission time.

5. The apparatus of claim 1, wherein the content analyzer includes a per title encoding trainer to perform offline training to generate an optimal video resolution and frame rate at a plurality of predetermined preselected bitrates for a received set of videos.

6. The apparatus of claim 1, wherein the content analyzer includes a frame analyzer to analyze the frame in real time to detect a scene change in the frame and generate a frame complexity index for the frame.

7. The apparatus of claim 1, wherein the content analyzer includes a frame analyzer having a fully connected layer with a plurality of hardware counters as inputs.

8. The apparatus of claim 1, wherein the adaptive decision executer is to:
 select the frame rate and the video resolution based on the predicted instant bitrate and the ladder info; and
 calculate a target frame rate based on the frame rate and the video resolution.

9. The apparatus of claim 1, wherein the content analyzer includes a per title encoding trainer to build a checkup table, the checkup table including:
 a plurality of preselected bitrates corresponding to the channel;
 a bitrate adaptive resolution per preselected bitrate; and
 a frame rate per preselected bitrate.

10. A method for adaptively encoding video frames, the method comprising:
 predicting, via a processor, an instant bitrate based on channel throughput feedback received from a network;

generating, via the processor, ladder info based on a received frame;
determining, after a determination that the ladder info is not empty and via the processor, a frame rate, a video resolution, and a target frame size based on the predicted instant bitrate and the ladder outputs;
determining, after a determination that the ladder info is empty and via the processor, the frame rate, the video resolution, and the target frame size based on a quantization parameter of a previously encoded frame and generated bits of the previously encoded frame; and
encoding, via the processor, the frame based on the frame rate, the video resolution, and the target frame size.

11. The method of claim 10, wherein encoding the frame includes generating a quantization parameter based on the frame rate, the video resolution, and the target frame size, and encoding the frame based on the quantization parameter.

12. The method of claim 10, wherein predicting the instant bitrate is based on the received channel throughput feedback and received historic data.

13. The method of claim 10, wherein predicting the instant bitrate is based on a first package transmission time.

14. The method of claim 10, further including performing offline training to generate an optimal video resolution and frame rate at a plurality of predetermined preselected bitrates for a received set of videos.

15. The method of claim 10, further including detecting a scene change in the frame and generating a frame complexity index for the frame.

16. The method of claim 10, further including detecting, via a neural network with a fully connected layer, a scene change and a frame complexity based on the frame.

17. The method of claim 10, further including selecting the frame rate and the video resolution based on the predicted instant bitrate and the ladder info, and calculating a target frame rate based on the frame rate and the video resolution.

18. The method of claim 10, further including:
receiving a plurality of training videos;
encoding each of the plurality of training videos with a plurality of bit rates, resolutions, and frame rates;
analyzing a quality of the encoded training videos using a same bitrate with different combinations of resolutions and frame rates; and
building a checkup table that includes:
a plurality of preselected bitrates corresponding to the plurality of training videos;
a bitrate adaptive resolution per preselected bitrate; and
a frame rate per preselected bitrate.

19. A system for adaptively encoding video frames, comprising:
means for predicting an instant bitrate based on channel throughput feedback received from a network;
means for generating ladder info based on a received frame;
means for determining to:
after a determination that the ladder info is not empty, determine a frame rate, a video resolution, and a target frame size based on the predicted instant bitrate and the ladder outputs; and
after a determination that the ladder info is empty, determine the frame rate, the video resolution, and the target frame size based on a quantization parameter of a previously encoded frame and generated bits of the previously encoded frame; and
means for encoding the frame based on the frame rate, the video resolution, and the target frame size.

20. The system of claim 19, further including means for generating a quantization parameter based on the frame rate, the video resolution, and the target frame size, wherein the encoder is to encode the frame based on the quantization parameter.

21. The system of claim 19, wherein the means for predicting the instant bitrate is to predict the instant bitrate on the received channel throughput feedback and received historic data.

22. The system of claim 19, wherein the means for predicting the instant bitrate includes a deep learning neural network trained to predict the instant bitrate based on a first package transmission time.

23. The system of claim 19, wherein the means for generating ladder info includes means for performing offline training to generate an optimal video resolution and frame rate at a plurality of predetermined preselected bitrates for a received set of videos.

* * * * *